(12) United States Patent
Saito et al.

(10) Patent No.: US 10,169,895 B2
(45) Date of Patent: Jan. 1, 2019

(54) SURROUNDING RISK DISPLAYING APPARATUS

(71) Applicant: SUBARU CORPORATION, Tokyo (JP)

(72) Inventors: Hirotaka Saito, Tokyo (JP); Junya Seki, Tokyo (JP); Kazufumi Suzuki, Tokyo (JP)

(73) Assignee: Subaru Corporation, Tokyo (JP)

( * ) Notice: Subject to any disclaimer, the term of this patent is extended or adjusted under 35 U.S.C. 154(b) by 0 days.

(21) Appl. No.: 15/455,389

(22) Filed: Mar. 10, 2017

(65) Prior Publication Data

US 2017/0287186 A1  Oct. 5, 2017

(30) Foreign Application Priority Data

Mar. 31, 2016 (JP) ................................. 2016/070826

(51) Int. Cl.
*G06T 15/00* (2011.01)
*G06T 11/60* (2006.01)
(Continued)

(52) U.S. Cl.
CPC .......... *G06T 11/60* (2013.01); *G06K 9/00805* (2013.01); *G06T 7/521* (2017.01);
(Continued)

(58) Field of Classification Search
None
See application file for complete search history.

(56) References Cited

U.S. PATENT DOCUMENTS 9,058,247 B2 * 6/2015 Fukamachi ............ G08G 1/166
9,852,635 B2 * 12/2017 Fukuda .................. G08G 1/167
(Continued)

FOREIGN PATENT DOCUMENTS

JP        10-211886 A      8/1998
JP        2006-154967 A    6/2006
(Continued)

OTHER PUBLICATIONS

Office Action issued in corresponding Japanese Patent Application No. 2016-070826, dated Aug. 8, 2017.
(Continued)

*Primary Examiner* — Andrew G Yang
(74) *Attorney, Agent, or Firm* — McDermott Will & Emery LLP

(57) ABSTRACT

A surrounding risk displaying apparatus includes an environment recognizer, a surrounding risk recognizer, and a display. The environment recognizer is capable of recognizing an environment around a vehicle. The surrounding risk recognizer is capable of extracting risk objects each having a risk potential not less than a predetermined risk potential, estimating a distribution of the risk potential around each of the risk objects, and calculating a risk approaching determination value that increases depending on relative approaching of the risk objects. The display is capable of displaying images in a superimposed fashion on the corresponding risk objects. The images each indicate the distribution of the risk potential around corresponding one of the risk objects. The display is capable of displaying, when the risk approaching determination value is not less than a predetermined threshold, a passage risk display indicating that passing through, by the vehicle, a clearance between the risk objects involves a risk.

6 Claims, 12 Drawing Sheets

(51) Int. Cl.
*H04N 13/296* (2018.01)
*G06T 7/521* (2017.01)
*G06T 7/593* (2017.01)
*G06K 9/00* (2006.01)

(52) U.S. Cl.
CPC ........... *G06T 7/593* (2017.01); *H04N 13/296* (2018.05); *G06K 9/00671* (2013.01); *G06T 2207/10021* (2013.01); *G06T 2207/30196* (2013.01); *G06T 2207/30236* (2013.01); *G06T 2207/30261* (2013.01)

(56) References Cited

U.S. PATENT DOCUMENTS

| | | | | |
|---|---|---|---|---|
| 9,889,847 | B2* | 2/2018 | Rangwala | B60W 30/0953 |
| 2005/0125121 | A1* | 6/2005 | Isaji | B60W 30/08 |
| | | | | 701/36 |
| 2008/0288140 | A1* | 11/2008 | Matsuno | B60T 8/17551 |
| | | | | 701/41 |
| 2011/0187515 | A1* | 8/2011 | Saito | B60T 7/22 |
| | | | | 340/425.5 |
| 2012/0303258 | A1* | 11/2012 | Pampus | B60W 30/0956 |
| | | | | 701/301 |
| 2013/0194127 | A1* | 8/2013 | Ishihara | G01S 13/18 |
| | | | | 342/70 |
| 2013/0325311 | A1* | 12/2013 | Yoo | G08G 1/16 |
| | | | | 701/301 |
| 2015/0210311 | A1* | 7/2015 | Maurer | B60W 30/09 |
| | | | | 701/41 |
| 2015/0339534 | A1* | 11/2015 | Morikawa | B60R 1/00 |
| | | | | 345/633 |
| 2017/0039438 | A1 | 2/2017 | Homma | |
| 2017/0106750 | A1* | 4/2017 | Tauchi | B60K 35/00 |
| 2017/0187963 | A1* | 6/2017 | Lee | G06F 3/013 |

FOREIGN PATENT DOCUMENTS

| | | |
|---|---|---|
| JP | 2007-099237 A | 4/2007 |
| JP | 2007-182224 A | 7/2007 |
| JP | 2011-070686 A | 4/2011 |
| WO | 2015/163205 A1 | 10/2015 |

OTHER PUBLICATIONS

Office Action issued in corresponding Japanese Patent Application No. 2016-070826, dated Mar. 8, 2018.

* cited by examiner

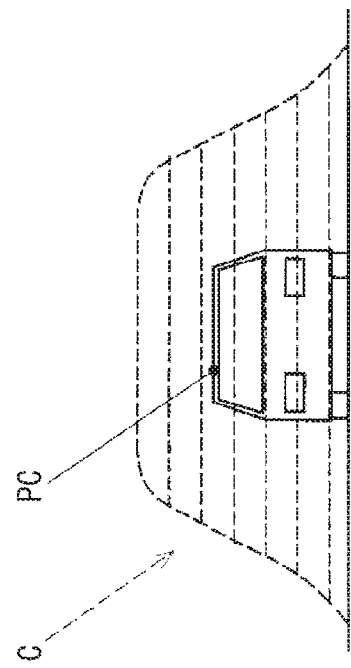
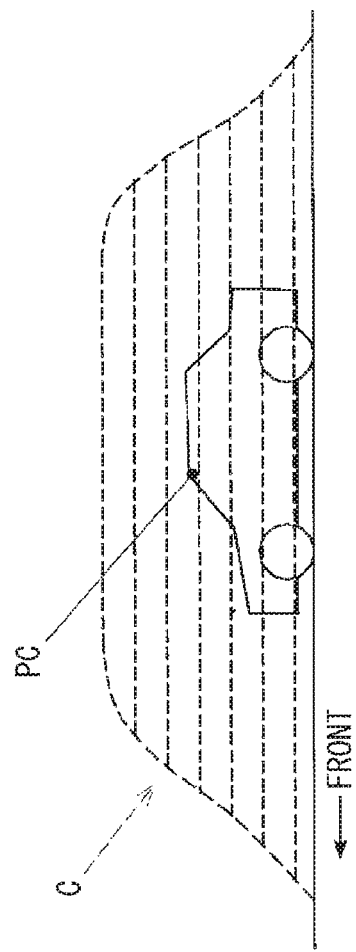

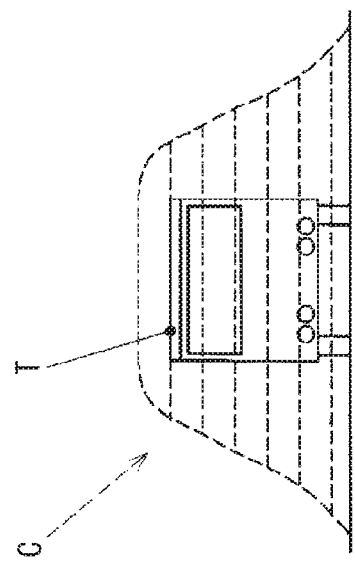
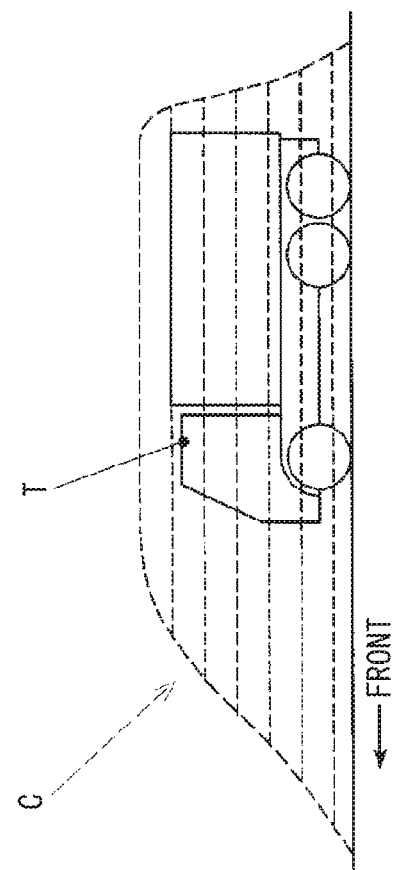

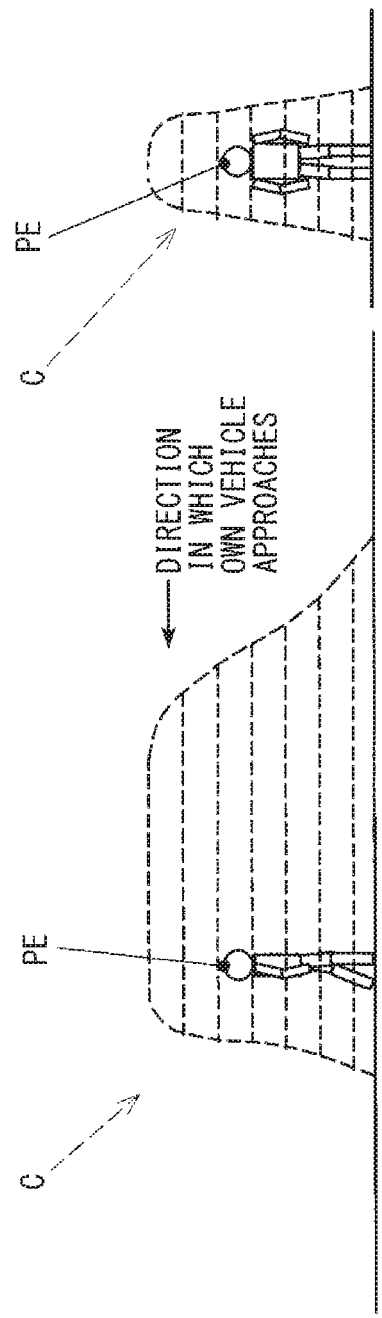

SURROUNDING RISK DISPLAYING APPARATUS

CROSS-REFERENCE TO RELATED APPLICATIONS

The present application claims priority from Japanese Patent Application No. 2016-070826 filed on Mar. 31, 2016, the entire contents of which are hereby incorporated by reference.

BACKGROUND

The technology relates to a surrounding risk displaying apparatus that displays, in the form of an image, a risk present in the surroundings of a vehicle such as an automobile.

To obviate an accident and thereby increase safety of a vehicle such as an automobile, a technique is desired that sequentially recognizes factors of various risk objects by means of various devices such as sensors, and conveys, to a user such as a driver, a level of a risk potential of each of the risk objects. The risk potential varies continuously depending on a traveling situation and a surrounding situation while the vehicle travels. Examples of the risk objects may include another traveling vehicle, a stopped vehicle, a pedestrian, a cyclist, a building, and terrains which are present in the surroundings of the own vehicle. Examples of the factor of the risk object may include a position and a velocity of the risk object both relative to the own vehicle.

As techniques that convey information on the surrounding risk to the user such as the driver, Japanese Unexamined Patent Application Publication (JP-A) No. 2011-70686 and No. 2007-182224 each disclose a vehicle driving operation assist apparatus that conveys a risk potential to the driver by means of touch information and visual information. The touch information involves the use of reaction force upon operation of an accelerator pedal. The visual information involves the use of image display by means of a head-up display (HUD). The vehicle driving operation assist apparatus displays contour lines that join parts that are equal in risk potential. The risk potential indicates a degree of approaching between the own vehicle and an obstacle present ahead of the own vehicle.

JP-A No. H10-211886 discloses a vehicle steering apparatus that allows a driver to recognize a situation around an own vehicle by suppressing the steering in accordance with a degree of risk. The vehicle steering apparatus detects obstacles around the own vehicle such as other vehicles by means of radar or any other device, and determines a risk potential of each of the obstacles, on the basis of information on a relative motion of each of the detected obstacles, such as other vehicles, relative to the own vehicle. The thus-determined risk potentials are each displayed in the form of contour lines.

SUMMARY

When a plurality of risk objects such as other vehicles are detected as being present by a surrounding risk displaying apparatus, passing through a clearance between those risk objects by an own vehicle may be possible physically. However, urging a driver to refrain from passing through the clearance is sometimes preferable even when it is physically possible, when a situation involves a high risk potential. For example, the risk potential is high when a distance between the risk objects is small, the risk objects are coming close to each other relatively, or the risk potential travels at a high speed.

It is desirable to provide a surrounding risk displaying apparatus that is able to appropriately display a risk upon passing through, by an own vehicle, a clearance between a plurality of risk objects.

An aspect of the technology provides a surrounding risk displaying apparatus that is configured to be provided in a vehicle and to display, as risk objects, objects around the vehicle each involving a risk. The surrounding risk displaying apparatus includes: an environment recognizer capable of recognizing an environment around the vehicle; a surrounding risk recognizer capable of extracting, on a basis of a result of the recognition performed by the environment recognizer, the risk objects each having a risk potential equal to or greater than a predetermined risk potential, and estimating a distribution of the risk potential around each of the corresponding risk objects, in which the surrounding risk recognizer is capable of calculating a risk approaching determination value that increases depending on relative approaching of the risk objects that come close to each other relatively; and a display capable of displaying images in a superimposed fashion on the corresponding risk objects. The images each indicate the distribution of the risk potential around corresponding one of the risk objects that are estimated by the surrounding risk recognizer. The display is capable of displaying, when the risk approaching determination value calculated by the surrounding risk recognizer is equal to or greater than a predetermined threshold, a passage risk display indicating that passing through, by the vehicle, a clearance between the risk objects involves a risk.

The display may be capable of displaying the passage risk display by coupling, in a continuous fashion, the images that indicate the distributions of the risk potentials around the corresponding risk objects.

The display may be capable of displaying the distribution of the risk potential by contour lines. The contour lines may be provided around each of the corresponding risk objects, and each may be provided by joining points that are equal in magnitude of the risk potential of the corresponding one of the risk objects.

The display may be capable of displaying the passage risk display by coupling the contour lines located between the risk objects in a shape of a wall provided over the clearance between the risk objects.

BRIEF DESCRIPTION OF THE DRAWINGS

FIGS. 5A and 5B each illustrate an example of display of contour lines of a risk potential performed by the surrounding risk displaying apparatus according to the first implementation of the technology, where a risk object is a passenger car.

FIGS. 6A and 6B each illustrate an example of the display of the contour lines of the risk potential performed by the surrounding risk displaying apparatus according to the first implementation of the technology, where the risk object is a truck.

FIGS. 8A and 8B each illustrate an example of the display of the contour lines of the risk potential performed by the surrounding risk displaying apparatus according to the first implementation of the technology, where the risk object is a pedestrian.

DETAILED DESCRIPTION

One implementation of the technology provides a surrounding risk displaying apparatus that is able to appropriately display a risk upon passing through, by a vehicle, a clearance between a plurality of risk objects. The surrounding risk displaying apparatus according to one implementation displays a wall-shaped passage risk display between the plurality of risk objects when a risk determination value is equal to or greater than a predetermined value. The risk determination value is set depending on a state of relative approaching of the risk objects that are close to each other. In one implementation, the risk determination value may serve as a "risk approaching determination value".

[First Implementation]

A surrounding risk displaying apparatus according to a first implementation as one example implementation of the technology is described below.

Figure 1:
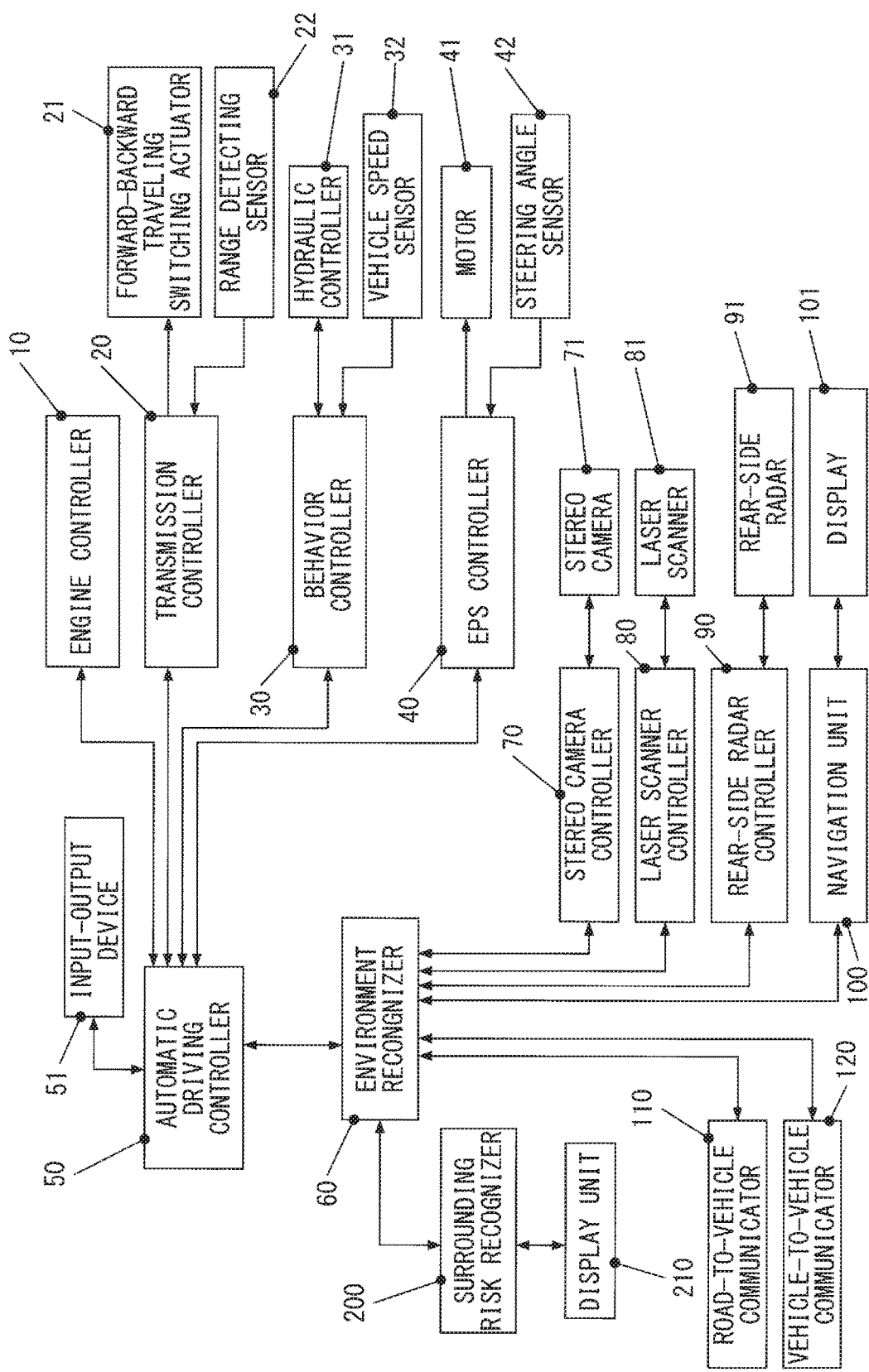
FIG. 1 is a block diagram schematically illustrating an example of a configuration of a vehicle to be provided with a surrounding risk displaying apparatus according to a first implementation of the technology.

FIG. 1 is a block diagram schematically illustrating an example of a configuration of a vehicle to be provided with the surrounding risk displaying apparatus according to the first implementation of the technology.

The surrounding risk displaying apparatus according to the first implementation of the technology may be provided in a vehicle 1 (see FIG. 2), for example. The vehicle 1 may be an automobile such as a passenger car that has an automatic driving function, for example. The surrounding risk displaying apparatus may perform image display for a user, etc., such as a driver at the time of manual driving. The image display performed by the surrounding risk displaying apparatus may relate to information on a risk around the vehicle 1, for example.

The user is allowed to monitor the risk around the vehicle 1 and thereby examine reasonableness of setting of a target traveling trajectory upon an automatic driving control, on basis of the information provided by the surrounding risk displaying apparatus at the time of the automatic driving.

The user is also allowed to receive driving assistance such as guidance on an appropriate traveling trajectory when the user himself/herself performs the manual driving as a driver.

Referring to FIG. 1, the vehicle 1 may include an engine controller 10, a transmission controller 20, a behavior controller 30, an electric power steering (EPS) controller 40, an automatic driving controller 50, an environment recognizer 60, a stereo camera controller 70, a laser scanner controller 80, a rear-side radar controller 90, a navigation unit 100, a road-to-vehicle communicator 110, a vehicle-to-vehicle communicator 120, a surrounding risk recognizer 200, a display unit 210, and any other component, for example.

Each of the foregoing units may include an information processor, a storage, an input and output interface, a bus, and any other component, for example. Non-limiting examples of the information processor may include a central processing unit (CPU). Non-limiting examples of the storage may include a random access memory (RAM) and a read only memory (ROM). The bus may couple the foregoing components to each other, for example. The foregoing units may be communicatable with each other, for example, via a local area network (LAN) system provided for a vehicle. Non-limiting example of the LAN system provided for a vehicle may include a controller area network (CAN) communication system.

In one implementation, the environment recognizer 60, the surrounding risk recognizer 200, and the display unit 210 may respectively serve as an "environment recognizer", a "surrounding risk recognizer", and a "display".

The engine controller 10 may control together an engine and any other auxiliary equipment. The engine may be a source of power allowing the vehicle 1 to travel.

The engine may be a four-stroke gasoline engine, for example.

The engine controller 10 may be able to control an output torque of the engine, for example, by controlling a throttle valve opening degree, a fuel injection amount, a fuel injection timing, and an ignition timing, of the engine. In one implementation, the engine controller 10 may be an engine control unit (ECU).

When the vehicle 1 is driven on the basis of a driving operation performed by the driver, the engine controller 10 may so control the output of the engine that an actual torque of the engine becomes closer to a torque required by the driver. The torque required by the driver may be set on the basis of a factor such as an operation amount of an accelerator pedal.

When the vehicle 1 performs the automatic driving, the engine controller 10 may control the output of the engine in accordance with instructions from the automatic driving controller 50.

The transmission controller 20 may transmit an output of revolutions of the engine, and control together an unillustrated transmission and any other auxiliary equipment. The transmission may switch between forward traveling and backward traveling of the vehicle 1. In one implementation, the transmission controller 20 may be a transmission control unit (TCU).

When the vehicle 1 performs the automatic driving, the transmission controller 20 may perform operations such as range switching and setting of a transmission ratio in accordance with the instructions from the automatic driving controller 50. The range switching may switch between forward traveling and backward traveling, for example.

Non-limiting examples of the transmission may include various automatic transmissions such as continuously-variable transmissions (CVT) of a chain type, a belt type, or a toroidal type, a step-variable automatic transmission (AT), a dual clutch transmission (DCT), and an automated manual transmission (AMT). The step-variable AT, the DCT, and the AMT may each include a plurality of planetary gear sets.

The transmission may include, for example, a driving start device, a forward-backward traveling switching mechanism, and any other component in addition to a transmission mechanism. Non-limiting examples of the transmission mechanism may include a variator. Non-limiting examples of the driving start device may include a torque converter, a dry clutch, and a wet clutch. The forward-backward traveling switching mechanism may switch between a forward traveling range and a backward traveling range.

The transmission controller 20 may be coupled to devices such as a forward-backward traveling switching actuator 21 and a range detecting sensor 22.

The forward-backward traveling switching actuator 21 may drive a forward-backward traveling switching valve and thereby switch between the forward traveling and the backward traveling of the vehicle 1. The forward-backward traveling switching valve may switch an oil passage that performs hydraulic supply to the forward-backward traveling switching mechanism.

The forward-backward traveling switching actuator 21 may be an electric actuator such as a solenoid, for example.

The range detecting sensor 22 may be a sensor or a switch that determines whether a range currently selected by the transmission is the forward traveling range or the backward traveling range.

The behavior controller 30 may control wheel cylinder hydraulic pressures of hydraulic service brakes provided on respective front-right, front-left, rear-right, and rear-left wheels, independently of each other. The behavior controller 30 may thus perform a control including a behavior control and an anti-lock brake control. The behavior control may suppress a behavior of the vehicle 1 such as understeer and oversteer. The anti-lock brake control may prevent wheel lock at a time of braking.

The behavior controller 30 may be coupled to devices such as a hydraulic controller 31 and a vehicle speed sensor 32.

The hydraulic controller 31 may include an electric pump, a valve, and any other component, for example. The electric pump may pressurize brake fluid that is working fluid of the hydraulic service brake. The valve may adjust hydraulic supply to the wheel cylinders of the respective wheels independently of each other. In one implementation, the hydraulic controller 31 may be a hydraulic control unit (HCU).

When the vehicle 1 performs the automatic driving, the hydraulic controller 31 may provide a braking force to the wheel cylinders of the respective wheels in response to brake instructions from the automatic driving controller 50.

The vehicle speed sensor 32 may be provided on a hub of each of the wheels. The vehicle speed sensor 32 may generate a vehicle speed pulse signal having a frequency that is proportional to revolution speed of the corresponding wheel.

The vehicle speed sensor 32 may be able to determine a traveling speed of the vehicle 1 (a vehicle speed) by detecting the frequency of the vehicle speed pulse signal and performing predetermined arithmetic processing on the basis of the detected frequency of the vehicle speed pulse signal.

The electric power steering (EPS) controller 40 may control together an electric power steering device and any other auxiliary equipment. The electric power steering device may assist, with an electric motor, a steering operation performed by the driver.

The EPS controller 40 may be coupled to devices such as a motor 41 and a steering angle sensor 42.

The motor 41 may be an electric actuator that applies an assist force to a steering system of the vehicle 1 and thereby assists the steering operation performed by the driver. Alternatively, the motor 41 may be an electric actuator that changes a steering angle at the time of the automatic driving.

When the vehicle 1 performs the automatic driving, the motor 41 may so apply a torque to the steering system that the steering angle of the steering system becomes closer to a predetermined target steering angle and thereby allow for steering, in response to steering instructions from the automatic driving controller 50.

The steering angle sensor 42 may detect a current steering angle of the steering system of the vehicle 1.

The steering angle sensor 42 may include a position encoder that detects an angular position of a steering shaft, for example.

The automatic driving controller 50 may supply, when an automatic driving mode is selected, control instructions to the foregoing units such as the engine controller 10, the transmission controller 20, the behavior controller 30, and the EPS controller 40. The automatic driving controller 50 may thus execute the automatic driving control that allows the vehicle 1 to travel automatically.

The automatic driving controller 50 may execute, when the automatic driving mode is selected, the automatic driving on the basis of, for example, information supplied from the environment recognizer 60 and instructions from an unillustrated driver. The information supplied from the environment recognizer 60 may be related to a situation around the vehicle 1. Upon executing the automatic driving, the automatic driving controller 50 may set a target traveling trajectory along which the vehicle 1 is to travel, automatically perform operations such as acceleration (travel starting) of the vehicle 1, deceleration (stopping) of the vehicle 1, switching between forward traveling and backward traveling, and steering, and thereby allow the vehicle 1 to travel automatically to a preset destination.

In an example case where the driver prefers manual driving or where it is difficult to continue performing the automatic driving, the automatic driving mode may be terminated in response to a predetermined deactivation operation performed by the driver. This allows for returning to the manual driving mode in which the driver performs the manual driving.

The automatic driving controller 50 may be coupled to an input-output device 51.

The input-output device 51 may supply information such as an alert and other various messages provided from the automatic driving controller 50 to the user. The input-output device 51 may also receive an input of various operations performed by the user.

The input-output device 51 may include devices such as an image display device, an audio output device, and an operation input device, for example. Non-limiting examples of the image display device may include a liquid crystal display (LCD). Non-limiting examples of the audio output device may include a speaker. Non-limiting examples of the operation input device may include a touch panel.

The environment recognizer 60 may recognize information on the surroundings of the vehicle 1.

The environment recognizer 60 may recognize, for example, an obstacle and a shape of a lane of a road which the vehicle 1 is to travel, on the basis of information supplied from the respective units such as the stereo camera controller 70, the laser scanner controller 80, the rear-side radar controller 90, the navigation unit 100, the road-to-vehicle communicator 110, and the vehicle-to-vehicle communicator 120. Non-limiting examples of the obstacle may include a parked vehicle, a traveling vehicle, a building, terrains, and a pedestrian which are present around the vehicle 1.

The stereo camera controller 70 may control a plurality of sets of stereo cameras 71 provided around the vehicle 1. The stereo camera controller 70 may also perform image processing on an image transmitted from the stereo cameras 71.

Each of the stereo cameras 71 may include, for example, a pair of camera units that are disposed side by side. The camera units each may include an imaging optical system, a solid-state imaging device, a drive circuit, and a signal processor, for example. Non-limiting examples of the imaging optical system may include a lens. Non-limiting examples of the solid-state imaging device may include a complementary metal oxide semiconductor (CMOS).

The stereo camera controller 70 may recognize a shape and a position relative to the vehicle 1 of an object captured by the stereo cameras 71 on the basis of a result of the image processing utilizing a stereo image processing technique.

The laser scanner controller 80 may control a laser scanner 81. The laser scanner controller 80 may also recognize, as a three-dimensional (3D) point cloud data, various objects such as a vehicle and an obstacle in the surroundings of the vehicle 1, on the basis of an output from the laser scanner 81.

The rear-side radar controller 90 may control rear-side radar 91 that is provided on each of a left-side part and a right-side part of the vehicle 1. The rear-side radar controller 90 may also detect an object that is present in a rear-side region of the vehicle 1 on the basis of an output from the rear-side radar 91.

The rear-side radar 91 may be able to detect another vehicle approaching from the rear-side region of the vehicle 1, for example.

Non-limiting examples of the rear-side radar 91 may include LiDAR and radar such as millimeter wave radar.

Figure 2:
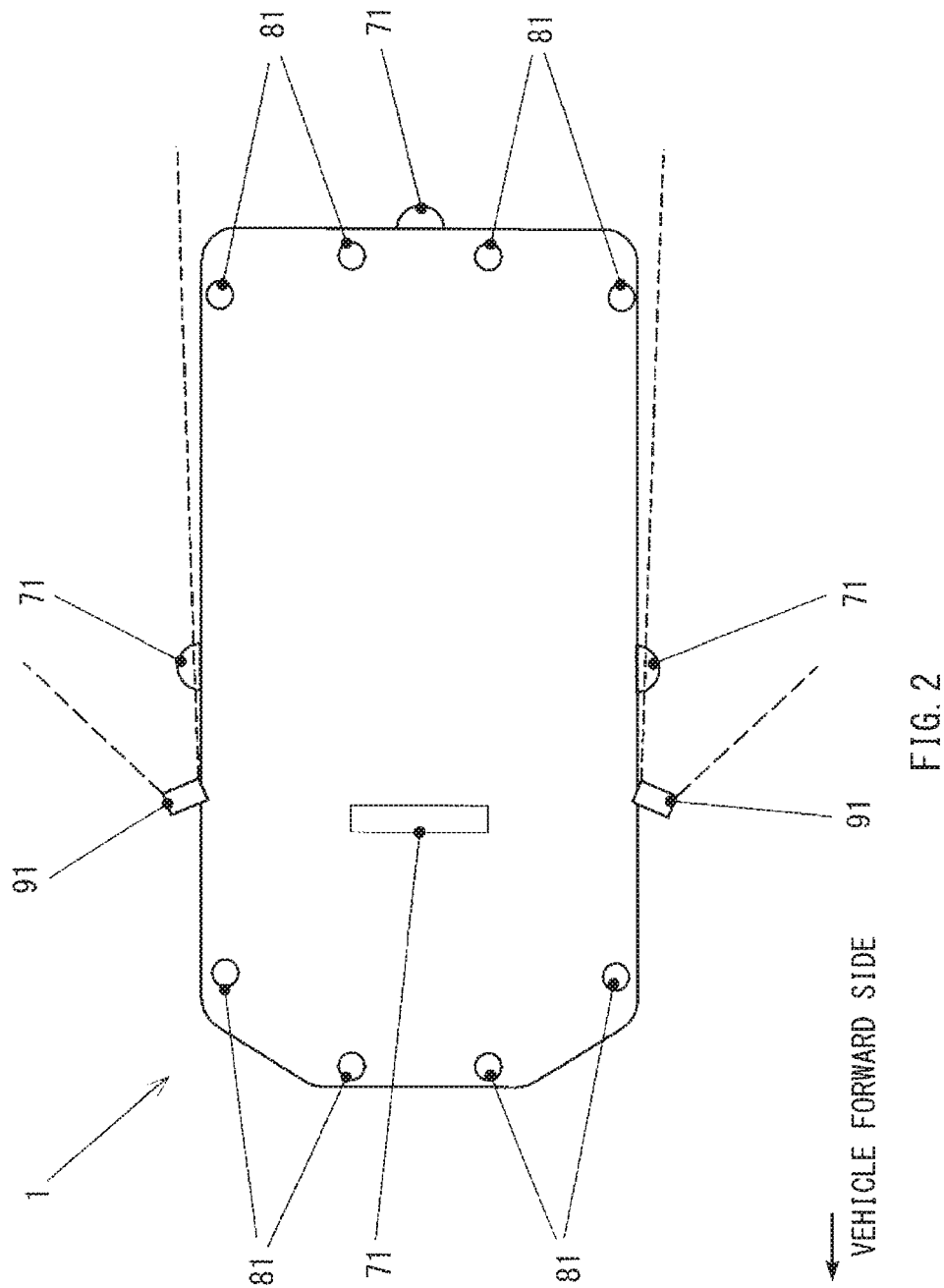
FIG. 2 schematically illustrates an example of an arrangement of sensors that recognize surroundings of the vehicle according to the first implementation of the technology.

FIG. 2 schematically illustrates an example of an arrangement of sensors provided in the vehicle 1 according to the first implementation. The sensors may recognize the surroundings of the vehicle 1.

The stereo cameras 71 may be provided on each of a front part, a rear part, a left-side part, and a right-side part of the vehicle 1.

The laser scanner 81 may include a plurality of laser scanners 81. The plurality of laser scanners 81 may be so distributed that substantially no blind spot is present in the surroundings of the vehicle 1.

The rear-side radar 91 may be disposed on each of the left-side part and the right-side part of the vehicle 1 for example. The rear-side radar 91 may have a detection range that is directed rearward of the vehicle 1 and is directed outside in a widthwise direction of the vehicle 1.

The navigation unit 100 may include a device such as a vehicle position determiner, a data storage, and a gyroscope. Non-limiting examples of the vehicle position determiner may include a global positioning system (GPS) receiver. The data storage may store map data that is prepared in advance, for example. The gyroscope may detect an orientation of the vehicle 1, for example.

The map data may include road information such as information on a road, an intersection, and an interchange. The road information may be so in detail as to include the information of lanes.

The road information may include three-dimensional data on a shape of a lane, and information on restrictions on traveling, for example. Non-limiting examples of the information on restrictions may include information on allowance or prohibition of right-hand turn and left-hand turn in each lane, a position requiring temporal stop of a vehicle, and a speed limit.

The navigation unit 100 may include a display 101 that is built in an instrument panel 340 which will be described later.

The display 101 may be an image display device that displays various pieces of information that are supplied by the navigation unit 100 to the driver.

The display 101 may include a touch panel. Thus, the display 101 may also serve as an input unit that receives various operation inputs performed by the driver.

The road-to-vehicle communicator 110 may communicate with an unillustrated ground station via a communication system compliant with predetermined standards. The road-to-vehicle communicator 110 may thereby acquire information on a traffic jam, a lighting state of a traffic light machine, a road work, an accident site, a lane control, weather, and a situation of a road surface, or any other information, for example.

The vehicle-to-vehicle communicator 120 may communicate with an unillustrated other vehicle via a communication system compliant with predetermined standards. The vehicle-to-vehicle communicator 120 may thereby acquire information on a state of a vehicle such as a position, an azimuth, an acceleration rate, and a speed of another vehicle, information on an attribute of a vehicle such as a type of a vehicle and a size of a vehicle, and any other information.

The surrounding risk recognizes 200 may extract risk objects each involving a risk of collision with the vehicle 1, on the basis of the information on the recognition performed by the environment recognizer 60. Further, the surrounding risk recognizer 200 may estimate, in all directions around each of the risk objects: a level of a risk potential associated with each of the risk objects; and a distribution of a range in which the risk is influential. The level of the risk potential may be, in other words, a magnitude of the risk.

The surrounding risk recognizer 200 may perform the estimation of the risk potential on the basis of factors such as a type of each of the risk objects, a direction of movement of each of the risk objects, and a velocity of movement of each of the risk objects.

In one implementation, mapping of a distribution of the risk potential as a basic pattern of the distribution of the risk potential may be performed in advance for each direction (such as a forward direction, a rearward direction, and a lateral direction) with respect to a traveling direction of each of various risk objects. The mapped risk potential distribution may be stored in advance. On the basis of the basic pattern of the distribution of the risk potential, the surrounding risk recognizer 200 may correct the level of the risk potential and the distribution range to thereby set a distribution of the risk potential associated with each risk object individually.

Some specific but non-limiting examples of the distribution of the risk potential based on the type of the risk object are to be described later in greater detail.

Figure 3:
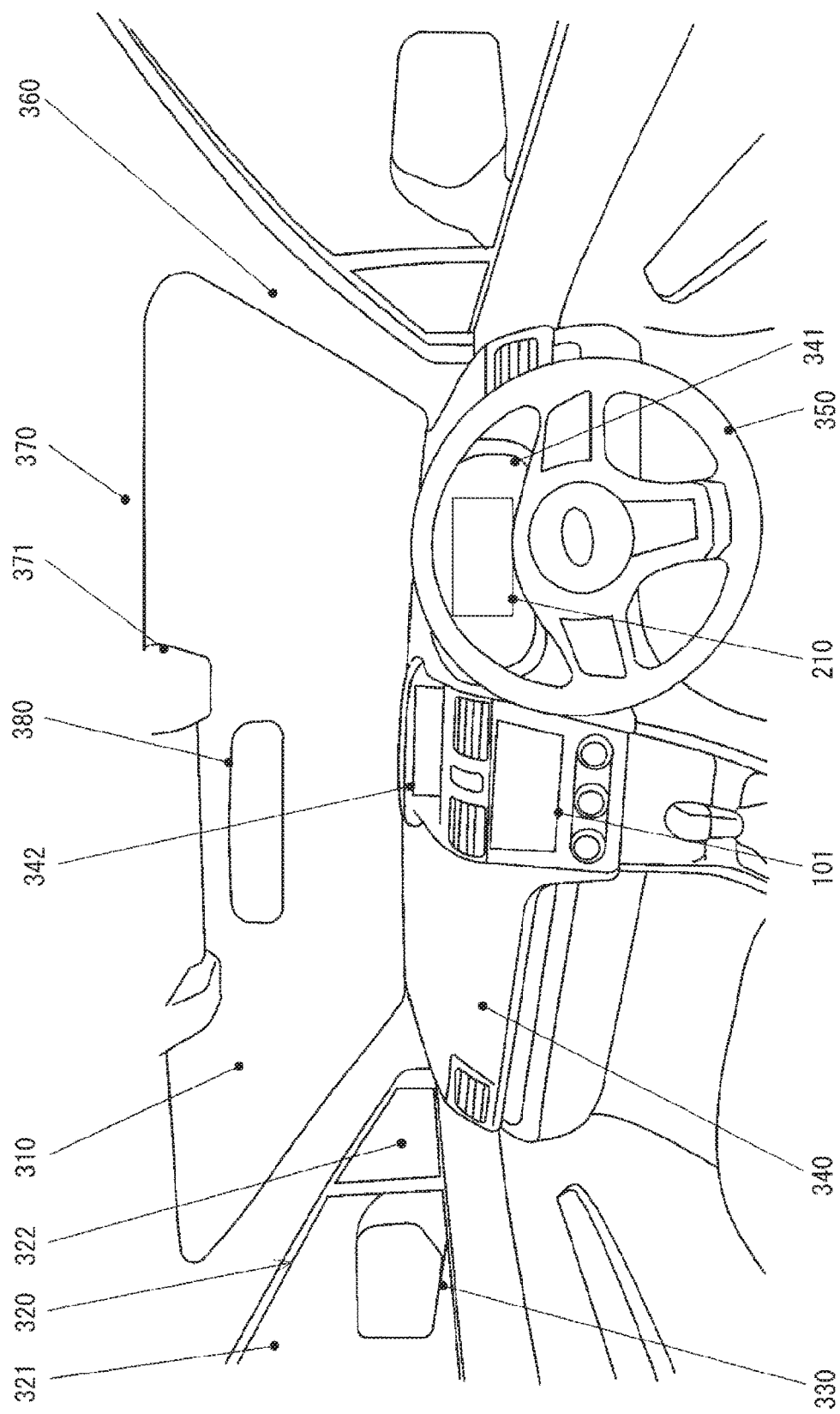
FIG. 3 illustrates an example of a view of a user in the vehicle provided with the surrounding risk displaying apparatus according to the first implementation of the technology.

FIG. 3 illustrates an example of a view of a user of the vehicle 1 that includes the surrounding risk displaying apparatus according to the first implementation of the technology. The user may be a driver at the time of the manual driving.

Referring to FIG. 3, the vehicle 1 may include the windshield 310, a front door glass 320, a side mirror 330, the instrument panel 340, a steering wheel 350, an A-pillar 360, a roof 370, the rear-view mirror 380, and any other component, for example.

The windshield 310 may be provided on forward side of the driver.

The windshield 310 may have a substantially rectangular shape that is longer in a lateral direction. The windshield 310 may be quadric surface glass that is so curved as to protrude in a forward direction, for example.

The windshield 310 may so incline rearward that a top end of the windshield 310 is located on rearward side of the vehicle 1 with respect to a bottom end of the windshield 310, for example.

The front door glass 320 may be provided on the side of the driver and on an upper part of each of right and left front doors. The right and left front doors may be used by an occupant such as the driver to board or leave the vehicle 1.

The front door glass 320 may include a main part 321 and quarter glass 322, for example. The main part 321 may be movable upward and downward. The quarter glass 322 may be provided on the forward side of the main part 321 in a fixed manner.

The side mirror 330 may allow the driver to confirm a view of a rear-left region or a view in a rear-right region.

The side mirror 330 may protrude outward in the widthwise direction of the vehicle 1 from an outer panel of each of a left front door and a right front door.

In a user's view, the side mirror 330 may be present in the vicinity of a front end of the main part 321 of the front door glass 320, for example.

The instrument panel 340 may be an interior member that is provided below the windshield 310 inside the vehicle interior.

The instrument panel 340 may also serve as an enclosure that contains components such as various meters, a display unit, switches, an air conditioner, an airbag of a navigator's seat, and a knee-protection airbag.

The instrument panel 340 may be provided with a combination meter 341, a multi-function display 342, the display 101 of the navigation unit 100, and any other component, for example.

The combination meter 341 may be provided in front of a driver's seat. The combination meter 341 may be an integration of various meters such as a speedometer, an engine revolution meter, and a milometer.

The combination meter 341 may include the display unit 210.

The multi-function display 342 may be provided in an upper part, of the middle in the widthwise direction of the vehicle 1, of the instrument panel 340, for example. The multi-function display 342 may be an image display device such as a liquid crystal display (LCD), for example.

The display 101 of the navigation unit 100 may be provided in a lower part, of the middle in the widthwise direction of the vehicle 1, of the instrument panel 340, for example.

The steering wheel 350 may be a circular operation member that receives the steering operation performed by the driver at the time of the manual driving.

The steering wheel 350 may be provided on the forward side of the driver and substantially face the driver.

The combination meter 341 may be viewable by the driver through an inner space on the upper half of the steering wheel 350 in the driver's view.

The A-pillar 360 may be a vehicle body structure member that has a pillar shape. The A-pillar 360 may be provided along a side end of the windshield 310 and a front end of the front door glass 320.

A surface of the A-pillar 360 inside the vehicle interior may be covered with a pillar trim made of resin, for example.

The roof 370 may extend rearward from the top end of the windshield 310.

A surface of the roof 370 inside the vehicle interior may be covered with a roof trim made of resin, for example.

A stereo camera container 371 may be provided on a front end, of the middle in the widthwise direction of the vehicle 1, of the roof 370, for example. The stereo camera container 371 may contain the stereo cameras 71 directed to capturing an image of the forward region.

The rear-view mirror 380 may be provided inside the interior of the vehicle 1. The rear-view mirror 380 may allow for confirmation of the rearward region.

The rear-view mirror 380 may be provided in the vicinity of the upper end, of the middle in the widthwise direction of the vehicle 1, of the windshield 310 with an unillustrated stay in between.

The display unit 210 may be an image display unit that faces the driver of the vehicle 1.

Non-limiting examples of the display unit 210 may include the LCD built in the combination meter 341 in the instrument panel 340 as illustrated in FIG. 3, for example.

The display unit 210 may have a function of displaying, in the form of contour lines as described below, the distribution of the risk potential around the risk object estimated by the surrounding risk recognizer 200.

Figure 4:
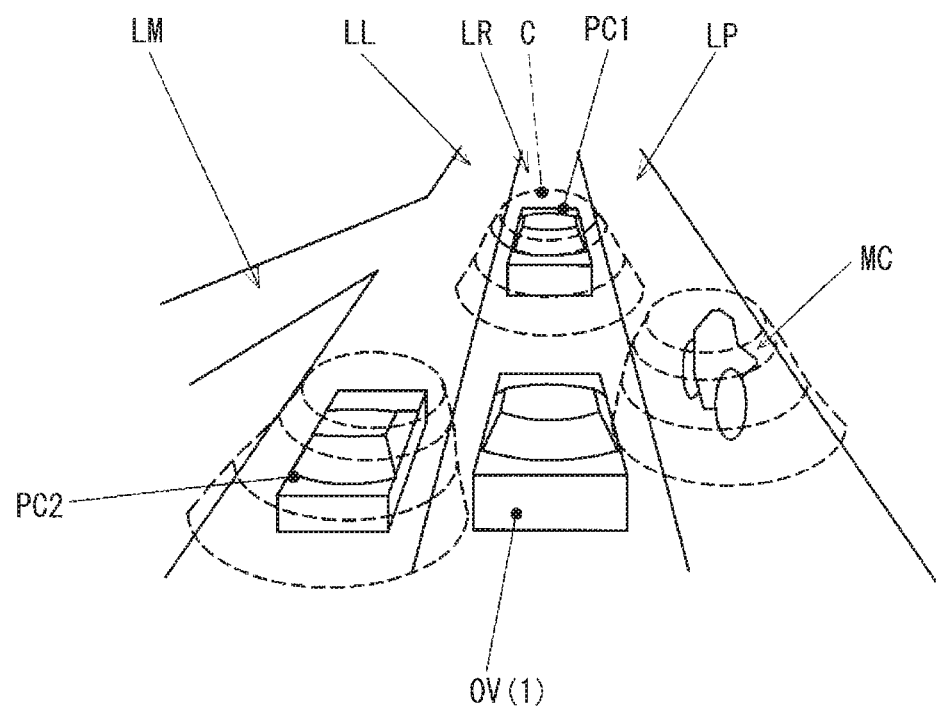
FIG. 4 illustrates an example of image display performed by the surrounding risk displaying apparatus according to the first implementation of the technology.

FIG. 4 illustrates an example of image display performed by the display unit 210, in which the own vehicle UV travels a left-hand traffic freeway having three lanes on one side. The freeway may be a high-standard vehicle-only road.

The image display may contain shapes of the lanes (e.g., shapes of white lines or any other colored lines) recognized by the environment recognizer 60.

The three lanes of the freeway in the image display of FIG. 4 may include a left travel lane LL, a right travel lane LR, and a passing lane LP in order from the left when viewing forward in the traveling direction.

A merging lane LM also merges into the left travel lane 11 at the front of an own vehicle OV. The own vehicle OV corresponds to the vehicle 1 in configuration.

The own vehicle OV may be traveling the right travel lane LR that is the middle lane of the three lanes in one example illustrated in FIG. 4.

A passenger car PC1 may be traveling the right travel lane LR at a location ahead of the own vehicle OV.

A passenger car PC2 may be traveling the left travel lane LL at a location on the side lateral to the own vehicle OV.

A two-wheeled vehicle MC may be traveling the passing lane LP ahead of the own vehicle OV in a right-front direction.

The display unit 210 may have the function of displaying the distribution of the risk potential around any risk object such as a vehicle around the own vehicle OV, by means of the contour lines C in the image display.

The display of the contour lines C may be display of annular lines (the contour lines C) around any risk object. The contour lines C each may be set by joining points that are estimated as being equal in magnitude of the risk potential around any risk object.

The display of the contour line C may be provided for each of parts of any risk object which involve the risk potentials of different magnitudes.

In an overhead view as illustrated in FIG. 4, the contour lines C may be so displayed that a height of the contour lines C as a whole from a road surface increases in an image with an increase in the risk potentials.

As a result, the plurality of contour lines C that indicate their respective risk potentials of different magnitudes may be displayed around any risk object. Such contour lines C of any risk object may form a shape in which the contour lines C are joined together by a smooth curved surface, whereby the contour lines C may be displayed in a shape of a mountain which an upper part is substantially narrowed and the corresponding risk object such as a vehicle is contained inside the mountain shape.

FIGS. 5A and 5B each illustrate an example of the display of the contour lines C of the risk potential performed by the surrounding risk displaying apparatus according to the first implementation of the technology, where the risk object is a passenger car PC.

FIG. 5A illustrates an example state in which the passenger car PC is seen from the side, whereas FIG. 5B illustrates an example state in which the passenger car PC is seen from the front.

Referring to FIGS. 5A and 5B, it is most likely that a region overlapped with the passenger car PC as the risk object involves a risk of collision when the own vehicle OV enters that region. Hence, the region overlapped with the passenger car PC involves the maximum risk potential, and may be displayed as being the highest in the risk potential in the display of the contour lines C accordingly.

The magnitude of the risk potential, i.e., the height of the contour lines C, may be so set that the magnitude or the height increases with an increase in factors such as a traveling speed of the risk object, a velocity of the risk object relative to the own vehicle OV, and a size of the risk object. For example, the risk object may be estimated as being heavier as the size of the risk object is larger.

The contour lines C that indicate the risk potential may be present on the front side, the rear side, and the lateral side of the passenger car PC as illustrated in FIGS. 5A and 5B.

The magnitude of the risk potential, i.e., the height of the contour lines C, may be so set that the magnitude or the height decreases gradually with an increase in distance from the passenger car PC.

The distribution of the risk potential with respect to the front side of the risk object may be set by taking into consideration a possibility that the own vehicle OV may be affected by a rear-end collision when the risk object so travels as to follow the own vehicle OV.

For example, the distribution of the risk potential with respect to the front side of the risk object may be so set that the risk potential is distributed widely with an increase in factors such as the traveling speed of the risk object, the velocity of the risk object relative to the own vehicle OV, and the size of the risk object. For example, the risk object may be estimated as being heavier as the size of the risk object is larger.

Further, the distribution of the risk potential with respect to the front side of the risk object may be so set that a region in which the risk potential is distributed becomes wide in examples where the own vehicle OV is decelerating, a traffic jam is ahead of the own vehicle OV, and an obstacle such as a stopped vehicle is ahead of the own vehicle OV. One reason is that the relative velocity, i.e., a difference in speed, between the own vehicle OV and the risk object that follows the own vehicle OV possibly increases in the near future.

With respect to the rear side of the risk object, the distribution of the risk potential may be set by taking into consideration a possibility that the own vehicle OV may collide with the risk object when the own vehicle OV so travels as to follow the risk object.

For example, the distribution of the risk potential with respect to the rear side of the risk object may be so set that the risk potential is distributed widely with an increase in factors such as the traveling speed of the risk object, the velocity of the risk object relative to the own vehicle OV, and the size of the risk object. For example, the risk object may be estimated as being heavier as the size of the risk object is larger.

Further, the distribution of the risk potential with respect to the rear side of the risk object may be so set that the region in which the risk potential is distributed becomes wide in examples where lighting of stop lamps of the preceding risk object is detected, deceleration of the risk object is detected, an occurrence of the traffic jam is detected by a road-to-vehicle communication or any other method, and a presence of an obstacle such as a stopped vehicle is detected by the road-to-vehicle communication or any other method. One reason is that the relative velocity, i.e., the difference in speed, between the risk object and the own vehicle OV that follows the risk object possibly increases in the near future.

With respect to the lateral side of the risk object, the distribution of the risk potential may be set by taking into consideration a possibility of collision between the own vehicle OV with the risk object attributed to a lateral movement in position, within a road, of one or both of the own vehicle OV and the risk object when the own vehicle OV and the risk object travel side by side.

For example, the distribution of the risk potential with respect to the lateral side of the risk object may be so set that the region in which the risk potential is distributed becomes wide in an example where an amount of traffic around the own vehicle OV is large and thus a large number of risk objects are present. One reason is to take into consideration a high possibility of a lane change to be made by the vehicle serving as the risk object.

The distribution of the risk potential with respect to the lateral side of the risk object may also be so set that the region in which the risk potential is distributed becomes wide in examples where a traffic jam is ahead of the lane along which the risk object travels, an obstacle such as the stopped vehicle is ahead of the lane along which the risk object travels, and lighting of a turn lamp of the vehicle serving as the risk object is detected.

FIGS. 6A and 6B each illustrate an example of the display of the contour lines C of the risk potential performed by the surrounding risk displaying apparatus according to the first implementation of the technology, where the risk object is a truck T.

FIG. 6A illustrates an example state in which the truck T is seen from the side, whereas FIG. 6B illustrates an example state in which the truck T is seen from the front.

Referring to FIGS. 6A and 6B, a maximum value of the risk potential may be set larger for a large-sized vehicle and a heavy vehicle such as the truck T than that in the example of the passenger car PC illustrated in FIGS. 5A and 5B. One reason is that the large-sized vehicle and the heavy vehicle such as the truck T both involve large kinetic energy and thus a risk upon collision is larger than that in the example of the passenger car PC illustrated in FIGS. 5A and 5B.

The distribution of the risk potential with respect to the front side of the truck T as the risk object may be so set that the region in which the risk potential is distributed becomes wider than that in the example of the passenger car PC, where the vehicle speed is about the same between example of the passenger car PC and the example of the truck T. One reason is that a maximum deceleration rate of the truck T upon braking is smaller than that of the passenger car PC and thus a braking distance of the truck T is estimated to be longer than that of the passenger car PC.

Further, a rate of change in the risk potential depending on a distance from the risk object, i.e., the truck T, may be set smaller than that in the example of the passenger car PC. One reason is that the risk potential of the truck T is larger than that of the passenger car PC, where a distance from the risk object is the same between the example of the truck T and the example of the passenger car PC.

On the other hand, the distribution of the risk potential with respect to the rear side of the truck T as the risk object may be so set that the region in which the risk potential is distributed becomes narrower than that in the example of the passenger car PC. One reason is that the small maximum deceleration rate of the truck T involves a relatively small risk of collision when the own vehicle OV follows the rear side of the truck T.

The distribution of the risk potential with respect to the lateral side of the truck T as the risk object may also be so set that the region in which the risk potential is distributed becomes narrower than that in the example of the passenger car PC. One reason is that a sudden lane change and a sudden change in traveling course are estimated to be less likely for the example of the large-sized vehicle such as the truck T than for the example of the passenger car PC.

Further, the rate of change in the risk potential depending on the distance from the risk object, i.e., the truck T, may be set larger than that in the example of the passenger car PC. One reason is that the risk potential is smaller than that in the example of the passenger car PC, where the distance from the risk object is the same between the example of the truck T and the example of the passenger car PC.

Figure 7B:
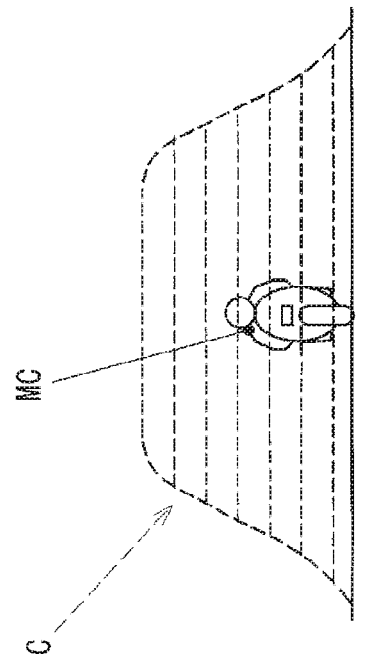
FIGS. 7A and 7B each illustrate an example of the display of the contour lines of the risk potential performed by the surrounding risk displaying apparatus according to the first implementation of the technology, where the risk object is a two-wheeled vehicle.
Figure 7A:
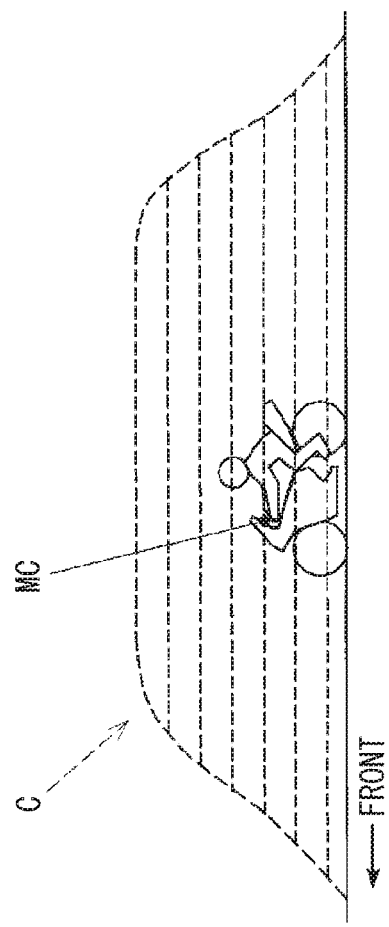

FIGS. 7A and 7B each illustrate an example of the display of the contour lines C of the risk potential performed by the surrounding risk displaying apparatus according to the first implementation of the technology, where the risk object is an automatic two-wheeled vehicle MC.

FIG. 7A illustrates an example state in which the automatic two-wheeled vehicle MC is seen from the side, whereas FIG. 7B illustrates an example state in which the automatic two-wheeled vehicle MC is seen from the front.

Referring to FIGS. 7A and 7B, the distribution of the risk potential with respect to the lateral side of the automatic two-wheeled vehicle MC as the risk object may be so set that the region in which the risk potential is distributed becomes wider than that in the example of the passenger car PC illustrated in FIGS. 5A and 5B. One reason is that possibilities of the sudden lane change and the sudden change in traveling course are higher for the example of the automatic two-wheeled vehicle MC than tier the example of the passenger car PC. Another reason is that a risk of falling due to a disturbance such as an irregular road surface may be estimated for the example of the automatic two-wheeled vehicle MC.

Further, a rate of change in the risk potential depending on a lateral distance from the risk object, i.e., the automatic two-wheeled vehicle MC, may be set smaller than that in the example of the passenger car PC.

FIGS. 8A and 8B each illustrate an example of the display of the contour lines C of the risk potential performed by the surrounding risk displaying apparatus according to the first implementation of the technology, where the risk object is a pedestrian PE.

FIG. 8A illustrates an example state in which the pedestrian PE is seen in a horizontal direction (seen from the lateral side) orthogonal to a direction in which the own vehicle OV approaches the pedestrian PE, whereas FIG. 8B illustrates an example state in which the pedestrian PE is seen from the own vehicle OV.

Referring to FIGS. 8A and 8B, in the estimation of the risk potential for the pedestrian PE, a risk of collision is more dominant for traveling of the own vehicle OV toward the pedestrian PE than for a movement of the pedestrian PE itself. One reason is that a velocity of movement of the pedestrian PE is smaller than that of the vehicle, etc.

Accordingly, the distribution of the risk potential of the pedestrian PE as the risk object may be so set that the region in which the risk potential is distributed becomes wide intensively in an orientation in which the own vehicle OV approaches the pedestrian PE as seen from the pedestrian PE, and becomes narrow in any other orientation, as illustrated in FIGS. 8A and 8B.

The distribution of the risk potential similar to that in the example of the pedestrian PE may be set for a stationary risk object such as a building, a parked vehicle, and terrains.

The surrounding risk recognizer 200 may also cause the display unit 210 to perform the image display by setting the risk potential of the vehicle, serving as the risk object and traveling along a lane close to a median strip (e.g., traveling on a center lane), to be relatively higher than that of the vehicle which travels along any other lane, when a plurality of lanes extending in the same direction as one another are present. The median strip is a boundary between the plurality of lanes and an oncoming lane.

One reason is that the vehicle traveling the center lane may possibly involve a relatively high risk of, for example, evading an oncoming vehicle that has deviated from the oncoming lane and causing a collision with the oncoming vehicle.

Further, when a state of approaching of a pair of risk objects that are close to each other satisfies a predetermined condition, the surrounding risk recognizer 200 causes the display unit 210 to provide display (passage risk display) indicating that passing through a clearance between the pair of risk objects involves a risk. Specifically, the display indicates that passing through the clearance between the pair of risk objects involves a risk in practice due to the high risk potential, even when passing through the clearance is physically possible by the own vehicle OV at the present moment.

Such a function of providing the display is effective in performing the driving assistance upon the manual driving and examining reasonableness of an expected traveling trajectory upon the automatic driving as well.

In the following, a description is given in detail of an operation of displaying the passage risk display.

Figure 9:
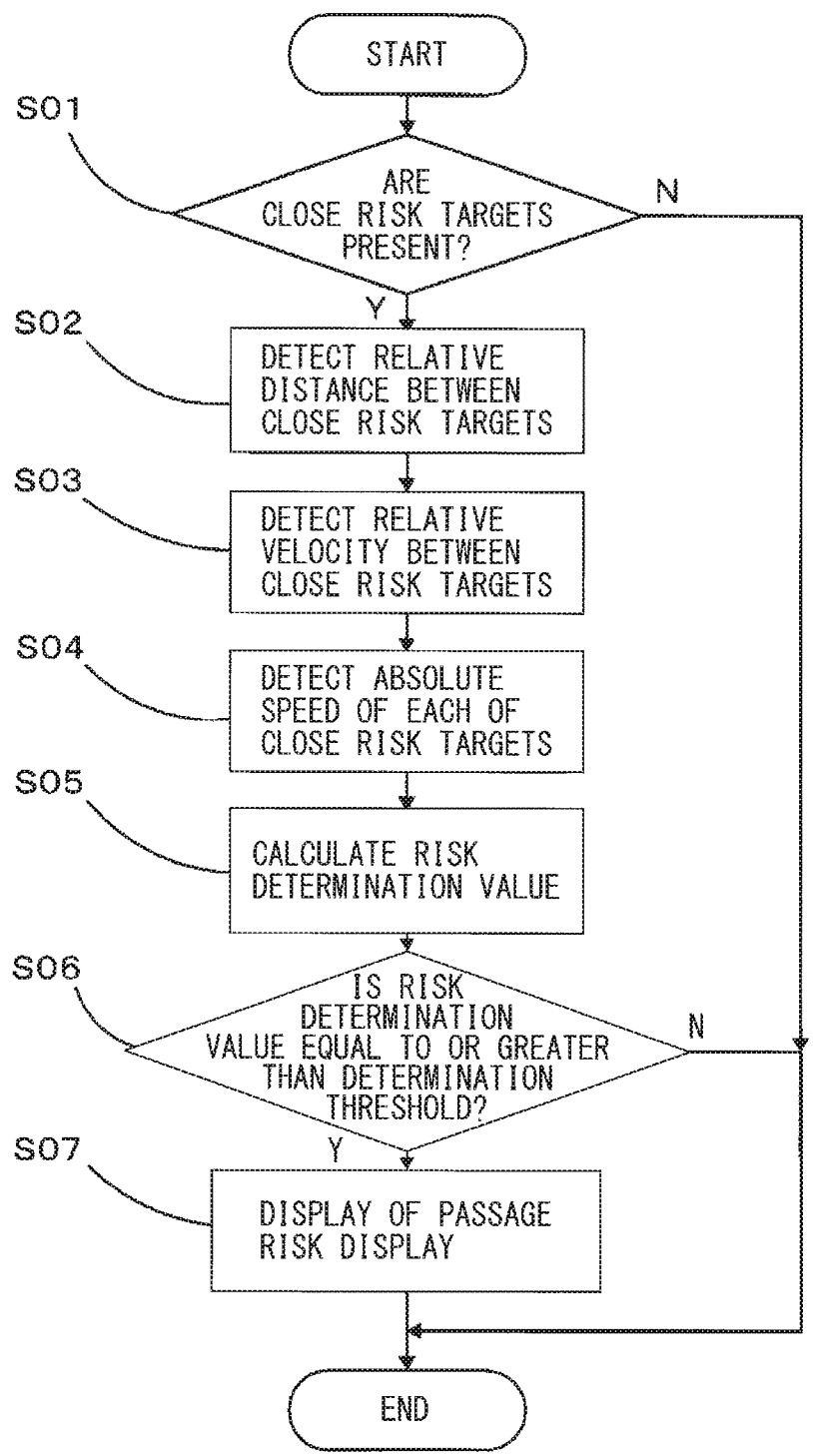
FIG. 9 is a flowchart illustrating an example of an operation performed by the surrounding risk displaying apparatus according to the first implementation of the technology, when the plurality of risk objects that are close to each other are present.

FIG. 9 is a flowchart illustrating an example of an operation performed by the surrounding risk displaying apparatus according to the first implementation of the technology, when the plurality of risk objects that are close to each other are present.

A description of the example operation is given on a step by step basis as below.

[Step S01: Determination of Close Risk Objects]

The surrounding risk recognizer 200 may make a determination as to whether the pair of risk objects that are close to each other (i.e., close risk objects) are present ahead of the own vehicle OV, on the basis of a result of the recognition performed by the environment recognizer 60. More specifically, the surrounding risk recognizer 200 may make the determination on the basis of an environment around the own vehicle OV recognized by the environment recognizer 60.

The flow may proceed to step S02 when the pair of close risk objects are determined as being present ahead of the own vehicle OV. Otherwise, the surrounding risk recognizer 200 may terminate (or perform returning of) a series of processes.

[Step S02: Detection of Relative Distance between Close Risk Objects]

The surrounding risk recognizer 200 may detect a relative distance between the pair of close risk objects that are determined in the step S01, on the basis of the result of the recognition performed by the environment recognizer 60.

The flow may thereafter proceed to step S03.

[Step S03: Detection of Relative Velocity between Close Risk Objects]

The surrounding risk recognizer 200 may detect a relative velocity between the pair of close risk objects that are determined in the step S01, on the basis of the result of the recognition performed by the environment recognizer 60.

The flow may thereafter proceed to step S04.

[Step S04: Detection of Absolute Speed of Close Risk Objects]

The surrounding risk recognizer 200 may detect an absolute speed (a traveling speed) of each of the pair of close risk objects that are determined in the step S01, on the basis of the result of the recognition performed by the environment recognizer 60.

The flow may thereafter proceed to step S05.

[Step S05: Calculation of Risk Determination Value]

The surrounding risk recognizer 200 may calculate a risk determination value that indicates a risk upon the passage of the own vehicle OV through the clearance between the pair of close risk objects that are determined in the step S01.

The risk determination value may be calculated by correcting a base value with factors such as the relative velocity and the absolute speeds of the close risk objects. The base value may be set on the basis of the relative distance between the close risk objects.

The risk determination value may be so corrected that the risk determination value increases with an increase in the relative velocity, when the relative velocity of the close risk objects indicates that the pair of close risk objects travel close to each other relatively. When the relative velocity of the close risk objects indicates that the close risk objects travel away from each other relatively, the risk determination value may be so corrected that the risk determination value decreases with the increase in the relative velocity.

The risk determination value may also be so corrected that the risk determination value increases with an increase in the absolute speed (the traveling speed) of each of the pair of close risk objects.

The risk determination value may be sequentially calculated and updated substantially on a real-time basis.

The flow may thereafter proceed to step S06.

[Step S06: Determination of Risk Determination Value]

The surrounding risk recognizer 200 may compare the risk determination value calculated in the step S05 with a previously-set determination threshold.

The flow may proceed to step 507 when the risk determination value is equal to or greater than the determination threshold. Otherwise, the surrounding risk recognizer 200 may terminate (or perform returning of) the series of processes.

[Step S07: Display of Passage Risk Display]

The surrounding risk recognizer 200 may cause the display unit 210 to provide the passage risk display. For example, the surrounding risk recognizer 200 may cause the display unit 210 to display the wall-shaped display in which top parts of the respective contour lines C formed around one of the close risk objects and top parts of the respective contour lines C formed around the other of the close risk objects are coupled to one another in a continuous fashion.

The wall-shaped display indicates that passing through, by the own vehicle OV, of the clearance between the close risk objects involves a risk.

The surrounding risk recognizer 200 may terminate (or perform returning of) the series of processes following completion of the step S07.

FIGS. 10A to 10D each illustrate an example of the display, performed by the surrounding risk displaying apparatus according to the first implementation of the technology, of the risk potentials around the respective risk objects that are close to each other.

The examples illustrated in FIGS. 10A to 10D are each directed to two passenger cars PCa and PCb as the pair of close risk objects. The passenger cars PCa and PCb travel side by side ahead of the own vehicle OV, and gradually come close to each other as seen from the own vehicle OV, i.e., as seen from the rear side of the passenger cars PCa and PCb.

Figure 10A:
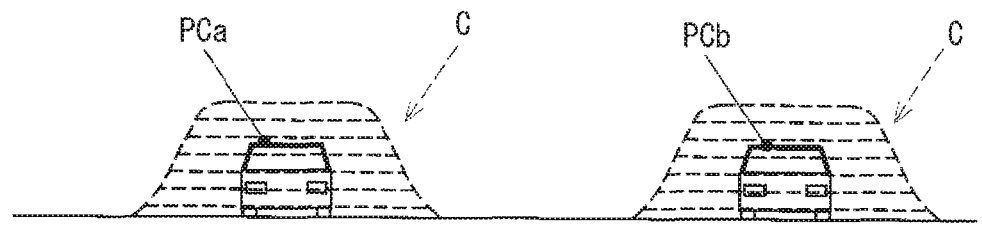
FIGS. 10A to 10D each illustrate an example of display, performed by the surrounding risk displaying apparatus according to the first implementation of the technology, of the risk potentials around the risk objects that are close to each other.
Figure 10B:
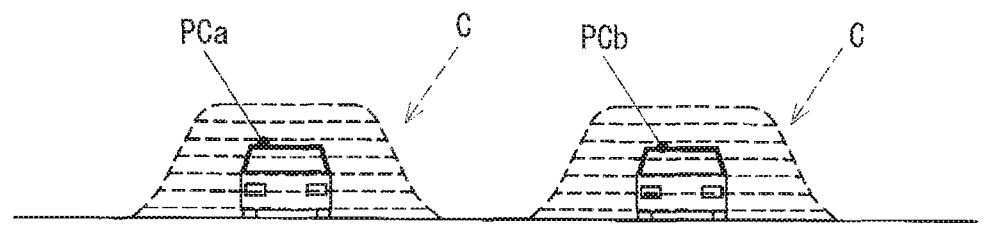

Referring to FIGS. 10A and 10B, the relative distance between the passenger cars PCa and PCb is sufficiently large, whereby a skirt of the display of the contour lines C formed around the passenger car PCa and a skirt of the display of the contour lines C formed around the passenger car PCb do not overlap with each other. The skirts of the contour lines C are, in other words, the ranges in which their respective risk potentials are influential.

Figure 10C:
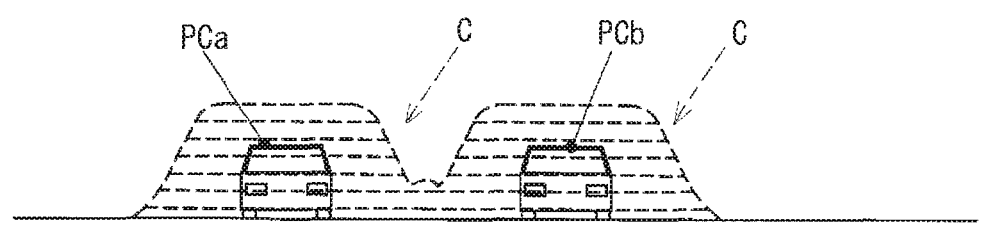

Referring to FIG. 10C, the relative distance between the passenger cars PCa and PCb becomes small, whereby the skirt of the display of the contour lines C formed around the passenger car PCa and the skirt of the display of the contour lines C formed around the passenger car PCb are overlapped with each other. In other words, the ranges in which their respective risk potentials are influential are overlapped with each other.

A region in which the skirt of one display of the contour lines C and the skirt of the other display of the contour lines C are overlapped with each other results in overlap of the risk potentials attributed to the respective passenger cars PCa and PCb. Hence, a magnitude of the risk potential in the region in which the skirts of the respective displayed contour lines C are overlapped with each other may be the sum of the risk potentials of the respective passenger cars PCa and PCb.

Figure 10D:
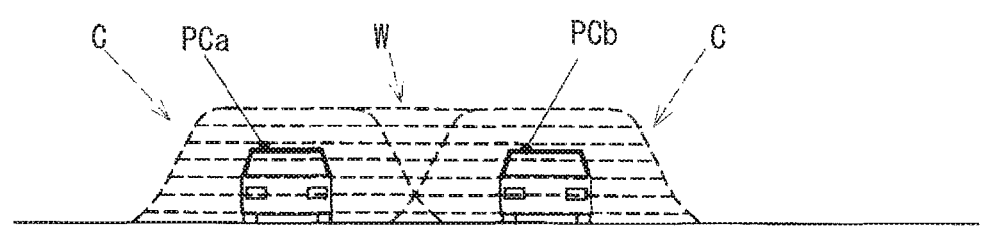

Referring to FIG. 10D, when the relative distance between the passenger cars PCa and PCb becomes further small and the risk determination value becomes equal to or greater than the determination threshold, the wall-shaped display W may be displayed in which the top parts of the respective displayed contour lines C of the risk potential attributed to the passenger car PCa and the top parts of the respective displayed contour lines C of the risk potential attributed to the passenger car PCb are coupled to one another in a continuous fashion.

Figure 11A:
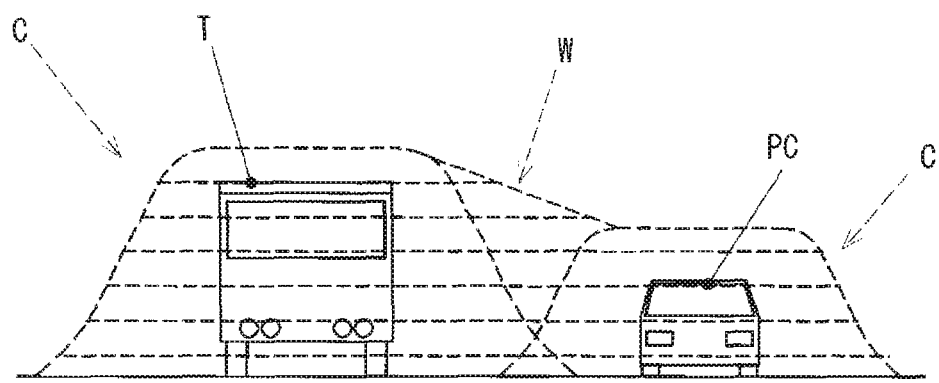
FIGS. 11A and 11B each illustrate another example of the display, performed by the surrounding risk displaying apparatus according to the first implementation of the technology, of the risk potentials around the risk objects that are close to each other.
Figure 11B:
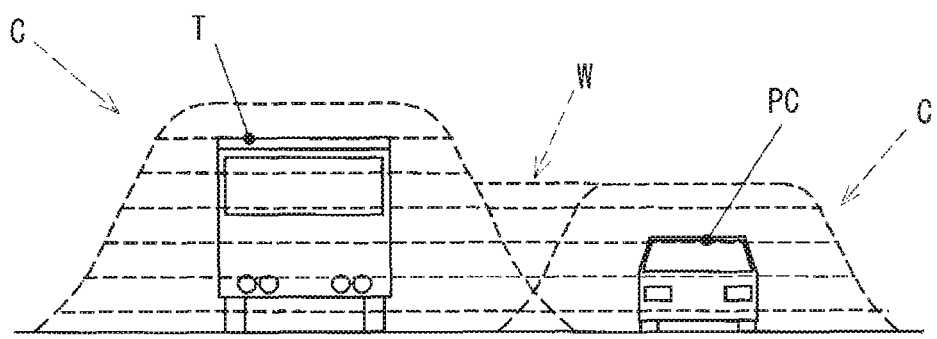

FIGS. 11A and 11B each illustrate another example of the display, performed by the surrounding risk displaying apparatus according to the first implementation of the technology, of the risk potentials around the respective risk objects that are close to each other.

The examples illustrated in FIGS. 11A and 11B are each directed to the truck T and the passenger car PC as the pair of close risk objects. The truck T and the passenger car PC travel side by side ahead of the own vehicle OV.

Referring to FIG. 11A, an upper end of the wall-shaped display W may have a shape in which a top end of the displayed contour lines C of one of the close risk objects (e.g., the truck T) and a top end of the displayed contour lines C of the other of the close risk objects (e.g., the passenger car PC) are coupled together in a continuous fashion, when the top parts of the respective displayed contour lines C of one of the close risk objects (e.g., the truck T) and the top parts of the respective displayed contour lines C of the other of the close risk objects (e.g., the passenger car PC) differ from one another in height. In other words, the upper end of the wall-shaped display W may have the foregoing shape, when the maximum value of the risk potential attributed to one of the close risk objects (e.g., the truck T) and the maximum value of the risk potential attributed to the other of the close risk objects (e.g., the passenger car PC) differ from each other.

Referring to FIG. 11B, the upper end of the wall-shaped display W may alternatively be disposed horizontally along the height of the top end of the displayed contour lines C of the risk potential attributed to any one of the close risk objects (e.g., any one of the truck T and the passenger car PC).

It is to be noted that the foregoing ways in which the wall-shaped display W is displayed are illustrative and non-limiting. The wall-shaped display W may be displayed in various ways on an as-needed basis.

The first implementation described above may achieve at least the following effects.

(1) The passage risk display (the wall-shaped display W) indicating that passing through, by the vehicle 1, the clearance between the plurality of risk objects involves a risk is displayed, when the risk determination value is equal to or greater than the determination threshold. The risk determination value is a parameter that indicates a risk upon passing through, by the vehicle 1, the clearance between the plurality of risk objects. Hence, it is possible to prevent a traveling trajectory in which the vehicle 1 passes through the clearance between the risk objects from being selected, and to urge a driver to refrain from performing dangerous traveling of the vehicle 1.

(2) The contour lines C of one of the risk objects and the contour lines C of the other of the risk objects may be so displayed as to be coupled in a continuous fashion with respect to one another when the risk determination value is equal to or greater than the determination threshold. Hence, it is possible to allow the user to understand that passing through, by the vehicle 1, the clearance between the plurality of risk objects involves a risk both visually in a simple fashion and intuitively.

(3) The distribution of risk potential may be indicated by the contour lines C. Hence, it is possible to allow the user to understand the distribution of the risk potential both intuitively and easily.

(4) The wall-shaped display W in which the contour lines C of one of the risk objects and the contour lines C of the other of the risk objects are coupled in a continuous fashion with respect to one another when the risk determination value is equal to or greater than the determination threshold. Hence, it is possible to allow the user to understand the risk of passing through, by the vehicle 1, the clearance between the plurality of risk objects intuitively owing to a feeling of oppressive and coercive pressures visually provided by the wall-shaped display W.

It is therefore possible to provide the surrounding risk displaying apparatus that is able to appropriately display a risk upon passing through, by the own vehicle, the clearance between the plurality of risk objects.

[Second Implementation]

A surrounding risk displaying apparatus according to a second implementation as one example implementation of the technology is described below.

It is to be noted that components of the second implementation substantially similar to those in the first implementation are denoted with the same numerals, and will not be described in detail. The following description is given mainly on differences between the first implementation and the second implementation.

Figure 12:
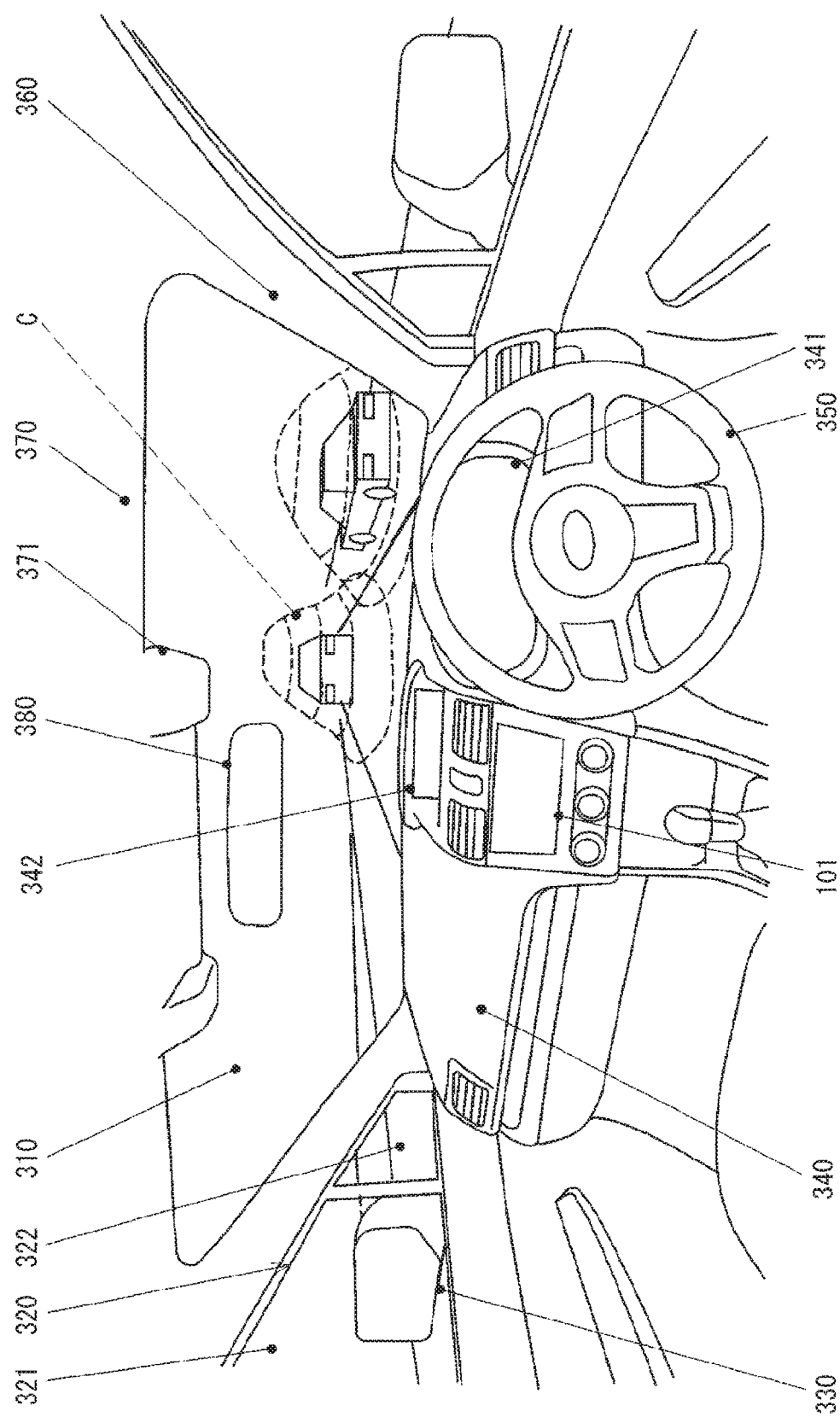
FIG. 12 illustrates an example of a view of a user in the vehicle provided with a surrounding risk displaying apparatus according to a second implementation of the technology.

FIG. 12 illustrates an example of a view of a user in the vehicle provided with the surrounding risk displaying apparatus according to the second implementation of the technology.

The surrounding risk displaying apparatus according to the second implementation performs the display on the windshield 310 having a function as a head-up display (HUD), instead of performing the display on the display unit 210 built in the instrument panel 340.

For example, the surrounding risk displaying apparatus may perform the display by projecting an image onto the windshield 310 by means of a projector incorporated in the instrument panel 340.

The surrounding risk displaying apparatus according to the second implementation allows the user to see, as real images, the various risk objects directly through the windshield 310. Non-limiting examples of such various risk objects may include another vehicle, a road, a lane, a building, a pedestrian, and a cyclist.

Further, the surrounding risk displaying apparatus according to the second implementation so displays the contour lines C of the risk potentials provided around the respective risk objects, and any other display, as to be superimposed on the real images. The display of the contour lines C of each of the risk potentials and any other display are displayed in the superimposed fashion as virtual images derived from the HUD.

The foregoing second implementation thus achieves an effect of reducing an amount of movement of eyes of the user such as the driver and further reducing a burden imposed on the user or the driver upon monitoring of surrounding risks accordingly, in addition to effects that are similar to those achieved by the foregoing first implementation.

[Modifications]

Although some implementations of the technology have been described in the foregoing, the technology is not limited to those implementations, and may be modified in a wide variety of ways without departing from the scope as defined by the appended claims.

(1) The configuration of the surrounding risk displaying apparatus, the configuration of the vehicle 1, and any other configuration are not limited to those described above referring to the implementations and are modifiable as appropriate. The foregoing implementations are described referring to an example case where the vehicle 1 is a passenger car. However, the technology is applicable to any other vehicle. For example, the technology is applicable to a commercial vehicle such as a cargo vehicle, a truck, a bus, an automatic two-wheeled vehicle, and other various special-purpose vehicles.

(2) The foregoing implementations are described referring to an example case where the vehicle 1 uses an engine as a source of power allowing the vehicle 1 to travel. However, the technology is not limited thereto. Alternatively, an electric motor, a hybrid system combining an engine and an electric motor, or any other source may be used as the source of power allowing the vehicle 1 to travel.

(3) The type, the arrangement, and any other factor of each of the sensors that recognize the environment around the vehicle 1 are not limited to those described in the foregoing implementations, and are modifiable as appropriate. For example, various sensors such as a millimeter wave sensor, LiDAR, a monocular camera, and ultrasonic sonar may be used together with or instead of the sensors referred to in the foregoing implementations.

Moreover, for example, recognition of the environment may be performed on the basis of information acquired by a method such as road-to-vehicle communication and vehicle-to-vehicle communication, and the map data included in a device such as the navigation device and a measuring device of a system such as GPS in addition to or instead of the information acquired by components such as the sensors mounted on the vehicle.

(4) The ways in which the risk potential is distributed on the basis of the types of risk objects described in the foregoing implementations are illustrative and non-limiting. The ways of distributing the risk potential may be modified in a variety of ways on an as-needed basis. Further, the rate of change in the risk potential depending on the distance from the risk object and the region in which the risk potential is distributed both may be varied in consideration of the factors such as the type, the position, and the state of movement of the risk object, in addition to any other factor other than those factors.

(5) The image display performed by the display unit 210 may be based on a two-dimensional (2D) image in which factors including the vehicle 1 and the road are seen from an overhead perspective as illustrated in FIG. 3, for example. The image display performed by the display unit 210, however, is not limited thereto. For example, the display unit 210 may perform three-dimensional (3D) display. The display unit 210 may alternatively display an image in which the factors such as the vehicle 1 and the road are seen from above in the form of top view.

(6) In the foregoing implementations, the display indicating that passing through, by the vehicle 1, the clearance between the pair of risk objects involves a risk is displayed by coupling the contour lines C of one of the risk objects and the contour lines C of the other of the risk objects in a continuous fashion with respect to one another in the shape of a wall. The passage risk display, however, is not limited thereto, and may be modified in a variety of ways on an as-needed basis. For example, a factor such as a mark, a figure, an illustration, and characters each indicating that passing through the clearance involves a risk may be displayed between the risk objects that are close to each other. The mark, the figure, the illustration, the characters, or any other display that indicate the risk of passing through the clearance may be displayed together with the wall-shaped display of the contour lines C.

Although some preferred implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A surrounding risk displaying apparatus that is configured to be provided in a vehicle and to display, as risk objects, objects around the vehicle each involving a risk, the surrounding risk displaying apparatus comprising:
   one or more sensors configured to obtain information about an environment around the vehicle;
   one or more processors configured to:
      recognize the environment around the vehicle based on information obtained by the one or more sensors,
      extract, on a basis of a result of the recognition, the risk objects each having a risk potential equal to or greater than a predetermined risk potential,
      estimate a distribution of risk potentials respectively around each of the corresponding risk objects, and
      calculate a risk approaching determination value for a pair of risk objects in proximity to each other that changes as a function of the relative velocity between the pair of risk objects; and
   a display configured to display images in a superimposed fashion on the corresponding risk objects, the images each indicating the estimated distribution of the risk potential around corresponding risk objects the display configured to display, when the calculated risk approaching determination value is equal to or greater than a predetermined threshold, a passage risk display indicating that passing through, by the vehicle, a clearance between the pair of risk objects involves a risk,
   wherein, when two distributions of risk potentials overlap, if the calculated risk approaching determination value is less than the predetermined threshold, display an overlapping risk potential corresponding to a sum of the two risk potentials where they overlap and, if the calculated risk approaching determination value is equal to or greater than the predetermined threshold, display the overlapping risk potential greater than that corresponding to the sum of the two risk potentials where they overlap as the passage risk display.

2. The surrounding risk displaying apparatus according to claim 1, wherein the display is configured to display the passage risk display by coupling, in a continuous fashion, the images that indicate the distributions of the risk potentials around the corresponding risk objects.

3. The surrounding risk displaying apparatus according to claim 2, wherein the display is configured to display the distribution of the risk potential by contour lines, the contour lines being provided around each of the corresponding risk objects, and each being provided by joining points that are equal in magnitude of the risk potential of the corresponding one of the risk objects.

4. The surrounding risk displaying apparatus according to claim 3, wherein the display is configured to display the passage risk display by coupling the contour lines located between the risk objects in a shape of a wall provided over the clearance between the risk objects.

5. The surrounding risk displaying apparatus according to claim 1, wherein the display is configured to display the distribution of the risk potential by contour lines, the contour lines being provided around each of the corresponding risk objects, and each being provided by joining points that are equal in magnitude of the risk potential of the corresponding one of the risk objects.

6. The surrounding risk displaying apparatus according to claim 5, wherein the display is configured to display the passage risk display by coupling the contour lines located between the risk objects in a shape of a wall provided over the clearance between the risk objects.

\* \* \* \* \*